United States Patent
Bertino

(10) Patent No.: US 8,443,514 B2
(45) Date of Patent: May 21, 2013

(54) MAINTENANCE METHOD OF A GAS TURBINE UNIT AND GAS TURBINE UNIT

(75) Inventor: Gianluigi Bertino, Bogliasco (IT)

(73) Assignee: Ansaldo Energia S.p.A., Genoa (IT)

( * ) Notice: Subject to any disclaimer, the term of this patent is extended or adjusted under 35 U.S.C. 154(b) by 602 days.

(21) Appl. No.: 12/594,206

(22) PCT Filed: Apr. 1, 2008

(86) PCT No.: PCT/EP2008/053895
§ 371 (c)(1),
(2), (4) Date: Feb. 2, 2010

(87) PCT Pub. No.: WO2008/119806
PCT Pub. Date: Oct. 9, 2008

(65) Prior Publication Data
US 2010/0126013 A1  May 27, 2010

(30) Foreign Application Priority Data
Apr. 2, 2007 (EP) .................... 07425193

(51) Int. Cl.
*B23P 6/00* (2006.01)

(52) U.S. Cl.
USPC ....... 29/888.021; 415/189; 415/113; 411/337

(58) Field of Classification Search ............. 29/888.021; 415/189, 113; 411/337
See application file for complete search history.

(56) References Cited

U.S. PATENT DOCUMENTS

| | | | |
|---|---|---|---|
| 1,097,185 A * | 5/1914 | Oehrle | 411/337 |
| 3,493,249 A | 2/1970 | Conrad, Jr. et al. | |
| 3,647,311 A | 3/1972 | Wootton et al. | |
| 4,817,417 A | 4/1989 | Twerdochlib | |
| 5,438,756 A | 8/1995 | Halchak et al. | |
| 5,618,161 A | 4/1997 | Papageorgiou et al. | |
| 5,848,874 A * | 12/1998 | Heumann et al. | 415/189 |
| 6,364,606 B1 | 4/2002 | Rice et al. | |
| 2005/0262030 A1* | 11/2005 | Drogan et al. | 705/500 |

FOREIGN PATENT DOCUMENTS

| | | |
|---|---|---|
| CH | 502547 | 1/1971 |
| DE | 11 20 216 | 12/1961 |
| EP | 1598764 | 11/2005 |
| EP | 1 884 879 | 2/2008 |
| JP | 61-013010 | 1/1986 |

OTHER PUBLICATIONS

Noll T: "Baugruppen Justierbar Befestigen" F & M. Feinwerktechnik Mikrotechnik Messtechnik, Hanser, Munchen, DE, vol. 100, No. 8, Aug. 1, 1992, pp. 357-362, XP000311999 ISSN:0944-1018 p. 260, left-hand column, paragraph 2;figure 6.
E.P.O. Office action, mail date is Mar. 5, 2012.

* cited by examiner

*Primary Examiner* — Peter DungBa Vo
*Assistant Examiner* — Azm Parvez
(74) *Attorney, Agent, or Firm* — Greenblum & Bernstein P.L.C.

(57) ABSTRACT

A maintenance method of a gas turbine unit, having a first stator element provided with first connecting holes contemplates replacing a second stator element, provided with second connecting holes and connected to the first stator element by means of coupling pins insertable into the first and the second connecting holes, with a third spare stator element provided with third connecting holes; and coupling the first stator element to the third spare stator element by means of eccentric coupling pins and eccentric bushes, each of which is selectively insertable in the first and the third connecting holes.

15 Claims, 4 Drawing Sheets

MAINTENANCE METHOD OF A GAS TURBINE UNIT AND GAS TURBINE UNIT

TECHNICAL FIELD

The present invention relates to a maintenance method of a gas turbine unit of an electric power plant.

BACKGROUND ART

An electric power plant generally comprises a gas turbine unit and a generator, mechanically connected to the gas turbine unit and connected to an electric distribution network. The gas turbine unit comprises a compressor, a combustion chamber and a gas turbine. Specifically, the gas turbine unit comprises a first stator element provided with first connecting holes and at least one second stator element provided with second connecting holes and connected to the first stator element.

In electric power plants of this type, maintenance operations which contemplate replacing the second stator element of the gas turbine unit with a third spare stator element sometimes need to be performed.

A known maintenance method of a gas turbine unit of an electric power plant contemplates replacing the second stator element with a third spare stator element provided with third connecting holes and coupling the first stator element to the third stator element by means of a plurality of coupling pins insertable in the first and the third connecting holes.

However, this type of technique is not effective in the very frequent cases in which the first and the third connecting holes are offset. Such offset, indeed, prevents the correct insertion of the coupling pins in the first and third connecting holes. In such case, in order to obtain the correct alignment between the first and the third connecting holes, the third spare stator element must be drilled again and the first connecting holes of the first stator element must be broadened. This technique is known as reworking the connecting holes.

However, the reworking of the first connecting holes of the first stator element cannot be performed countless times in view of the small space which is generally available by the sides of the first connecting holes. The reworking of the first connecting holes must be further performed directly on the gas turbine unit after coupling the third spare stator element to the first stator element; in most cases, on-site reworking is very burdensome, both in terms of time and in terms of costs.

DISCLOSURE OF THE INVENTION

It is an object of the present invention to provide a maintenance method of a gas turbine unit which is free from the above-mentioned drawbacks of the known art; specifically, it is an object of the invention to provide a method which does not require the on-site reworking of the connecting holes during the replacement of the second stator element of a gas turbine unit and which is concurrently simple and effective.

In accordance with such objects, the present invention relates to a maintenance method of a gas turbine unit; the gas turbine unit comprising:
a first stator element provided with first connecting holes;
at least a second stator element provided with second connecting holes;
coupling pins insertable in the first and second connecting holes for connecting the first stator element with the second stator element; the method comprising the step of replacing the second stator element with a third spare stator element provided with third connecting holes; the method being characterised in that it comprises the step of coupling the first stator element to the third spare stator element by means of eccentric pins and eccentric bushes, insertable within the first and the third connecting holes.

It is a further object of the invention to provide a maintenance method of a plurality of gas turbine units.

In accordance with such objects, the present invention relates to a maintenance method of a plurality of gas turbine units; each gas turbine unit comprising: a first stator element and at least one second stator element coupled to the first stator element; the method comprising the step of replacing the second stator element with a third stator element; the method being characterised in that the second stator element is repaired and made available as third spare stator element for any gas turbine unit of the plurality of gas turbine units.

It is a further object of the invention to make a gas turbine unit prearranged for the maintenance and the replacement of its composing stator elements.

In accordance with such objects, the present invention relates to a gas turbine unit comprising a first stator element provided with first connecting holes; at least a second stator element provided with second connecting holes; the gas turbine unit being characterised in that it comprises at least one eccentric bush selectively insertable in either a first or a second connecting hole and at least one eccentric coupling pin insertable in either the second or first connecting hole and in the eccentric bush.

BRIEF DESCRIPTION OF THE DRAWINGS

Further features and advantages of the present invention will be apparent in the following description of a non-limitative example of embodiment, with reference to the figures in the accompanying drawings, in which.

BEST MODE FOR CARRYING OUT THE INVENTION

Figure 1:
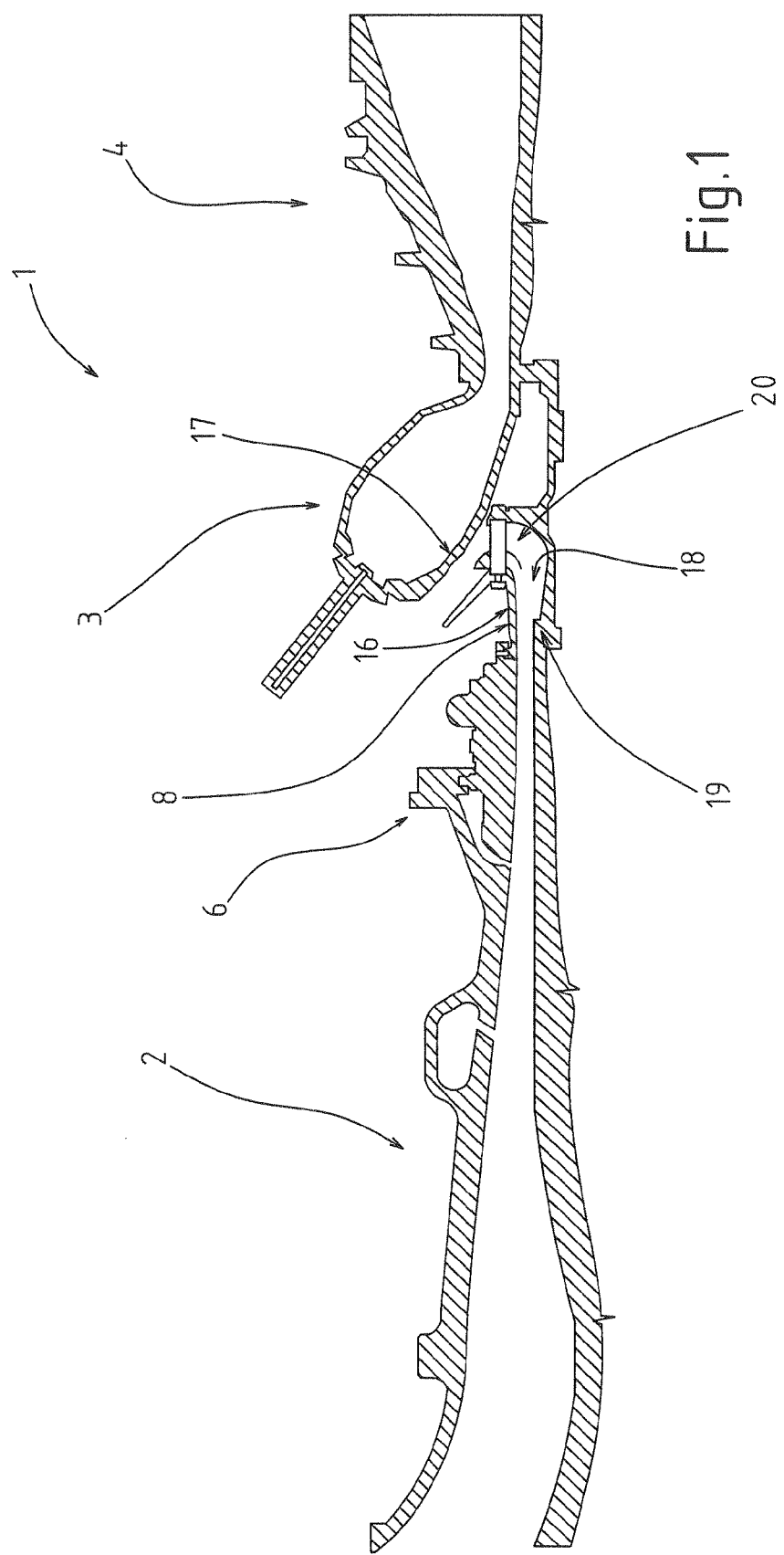
FIG. 1 is a section view, with parts removed for clarity, of a gas turbine unit according to the present invention.

In FIG. 1, reference numeral 1 represents a gas turbine unit comprising a compressor 2, preferably of the multistage axial type, a combustion chamber 3 and a gas turbine 4.

Gas turbine unit 1 comprises a first stator element 6 and a second stator element 8, reciprocally connected.

Hereinafter, a blade holder casing of compressor 2 will be considered as first stator element 6, while a diffuser-combustion chamber assembly will be considered as second stator element 8.

It is understood that first stator element 6 may be any of the stator components or component assemblies of gas turbine unit 1 and that second stator element 8 may be any of the stator components or component assemblies of gas turbine unit 1 connected to first stator element 6.

Figure 2:
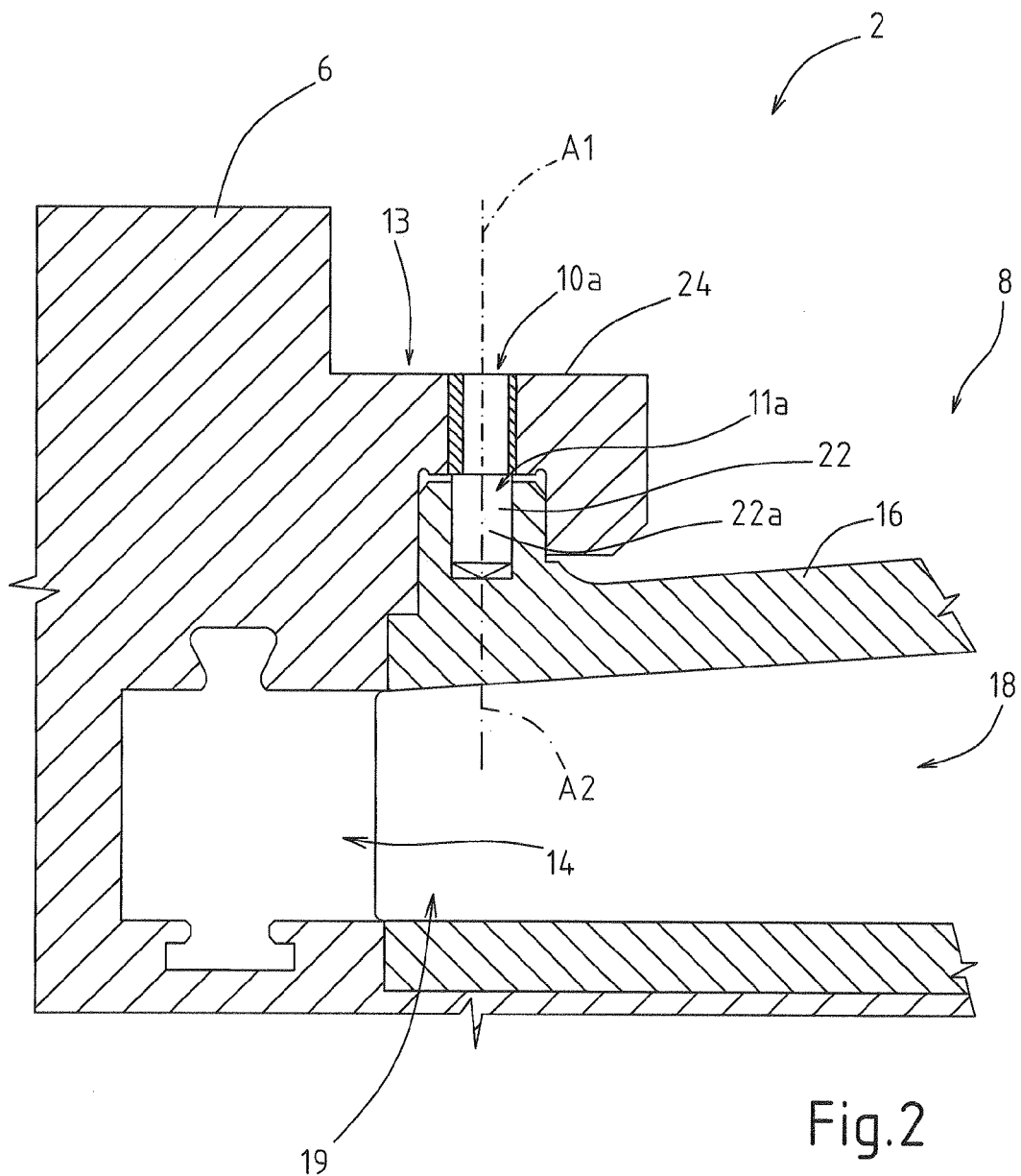
FIG. 2 is a side elevation view, with parts in section and parts removed for clarity, of a detail of the gas turbine unit in FIG. 1.

Blade holder casing 6 is adapted to support the fixed blades from the first to the last stage of compressor 2. With reference to FIG. 2, blade holder casing 6 is provided with first connecting holes 10 to one or more adjacent stator element (only one adjacent stator element, diffuser-combustion chamber assembly 8 in the case in point, and a single connecting hole, are shown for the sake of simplicity in FIG. 2). Each first connecting hole 10 extends along an axis A1 and generally presents a circular section. Specifically, blade holder casing 6 comprises a first connecting hole 10*a* in a portion 13 of blade holder casing 6 arranged at a last baffle stage 14 of compressor 2.

With reference to FIGS. 1 and 2, diffuser-combustion chamber assembly 8 comprises a diffuser 16 of compressor 2 and an internal portion 17 of combustion chamber 3. Specifically, diffuser 16 is adapted to divert the output air flow from compressor 2 towards combustion chamber 3 (visible only in FIG. 1) and defines a diverging annular channel 18 with curvilinear trend and increasing section. Specifically, diffuser 16 presents an inlet portion 19, which is connected to blade holder casing 6 and is near the last baffler stage 14, and an outlet section 20 (visible only in FIG. 1), near internal portion 17 of combustion chamber 3.

With reference to FIG. 2, diffuser-combustion chamber assembly 8 (only a portion of which is shown in FIG. 2) is provided with second connecting holes 11 to one or more adjacent stator element (only one adjacent stator element, blade holder casing 6 in the case in point, and only one connecting hole, are shown for the sake of simplicity in FIG. 2). Each second connecting hole 11 extends along an axis A2 and generally presents a circular section. Specifically, assembly 8 comprises a second connecting hole 11*a*, which is substantially arranged at inlet section 19 of diffuser 16 in contact with portion 13 of blade holder casing 6, and faces connecting hole 10*a* of blade holder casing 6.

The connection between adjacent stator elements is obtained by means of a plurality of coupling pins 22 adapted to connect blade holder casing 6 to assembly 8.

Figure 3:
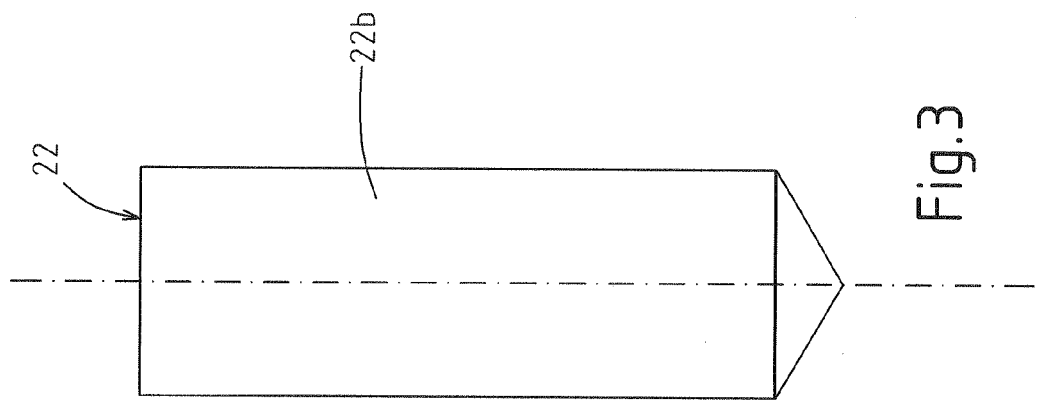
FIG. 3 is a side elevation view of a second detail of the gas turbine unit in FIG. 1.
Figure 7:
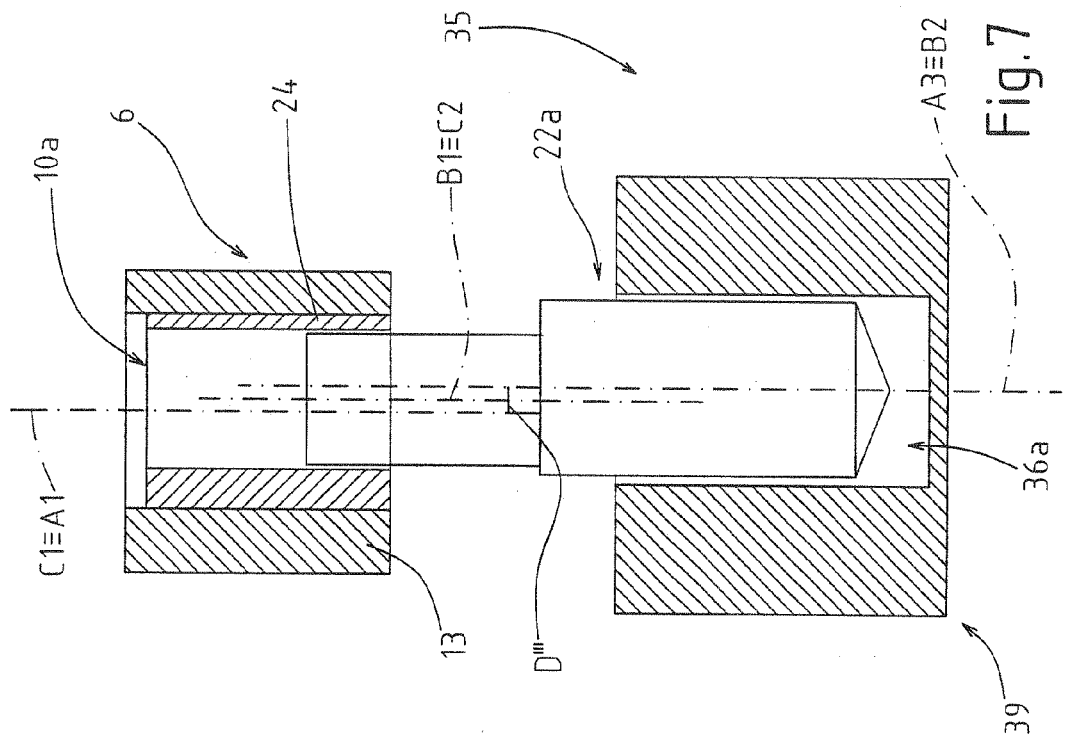
FIG. 7 is a section view, with parts removed for clarity, of the gas turbine unit in FIG. 1 in a step of coupling the spare part in FIG. 5.

Specifically, coupling pins 22 are insertable in first 10 and second connecting holes 11 and comprise eccentric coupling pins 22*a* and non-eccentric coupling pins 22*b* (FIG. 3).

The connection between adjacent stator elements is obtained by means of eccentric bushes 24, generally in number equal to the number of eccentric coupling pins 22*a*, adapted to be inserted in either first 10 or second connecting holes 11. In the non-limitative example shown in FIG. 2, eccentric bush 24 is inserted in first connecting hole 10*a* of blade holder casing 6 and an eccentric connecting pin 22*a* is inserted in second connecting hole 11*a* and in eccentric bush 24.

Figure 4:
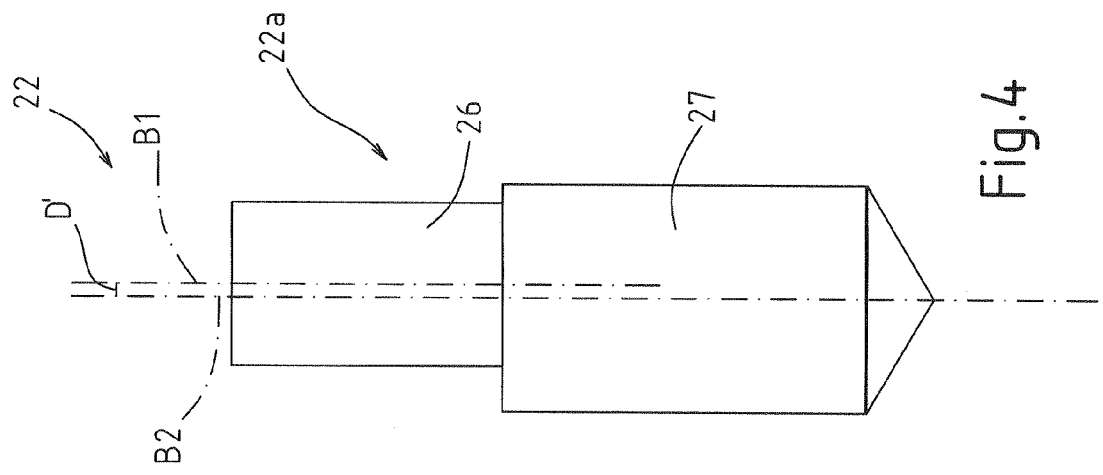
FIG. 4 is a side elevation view, with parts removed for clarity, of a third detail of the gas turbine unit in FIG. 1.

With reference to FIG. 4, each eccentric connecting pin 22*a* comprises a first circular section cylindrical body 26, which extends along a first axis B1 and a second circular section cylindrical body 27, which extends along a second axis B2. First axis B1 and second axis B2 are parallel and non-coinciding so that first cylindrical body 26 and second cylindrical body 27 present an offset D', considered as the distance between axis B1 and axis B2, comprised between 0 and approximately 50% of the diameter of second cylindrical body 27, e.g. approximately 2 mm as shown in accompanying FIG. 4.

Figure 5:
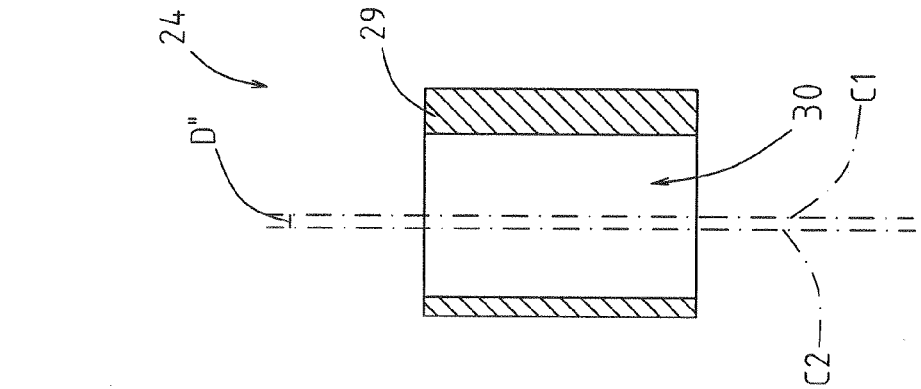
FIG. 5 is a section view, with parts removed for clarity, of a fourth detail of the gas turbine unit in FIG. 1.

With reference to FIG. 5, each eccentric bush 24 comprises a hollow circular section cylindrical body 29, which extends along an axis C1 and defines a circular section cylindrical seat 30 extending along an axis C2. Axis C1 and axis C2 are parallel and non-coinciding so that hollow cylindrical body 29 and cylindrical seat 30 present an offset D", considered as the distance between axis C1 and axis C2, comprised between 0 and approximately 50% of the diameter of hollow cylinder 29, e.g. approximately 2 mm as shown in accompanying FIG. 4.

Offsets D' and D", of eccentric pin 22*a* and bush respectively, are generally equal so that eccentric bush 24 and eccentric pin 22*a* may obtain, when appropriately coupled, an alignment configuration of axes B2 and C1.

Figure 6:
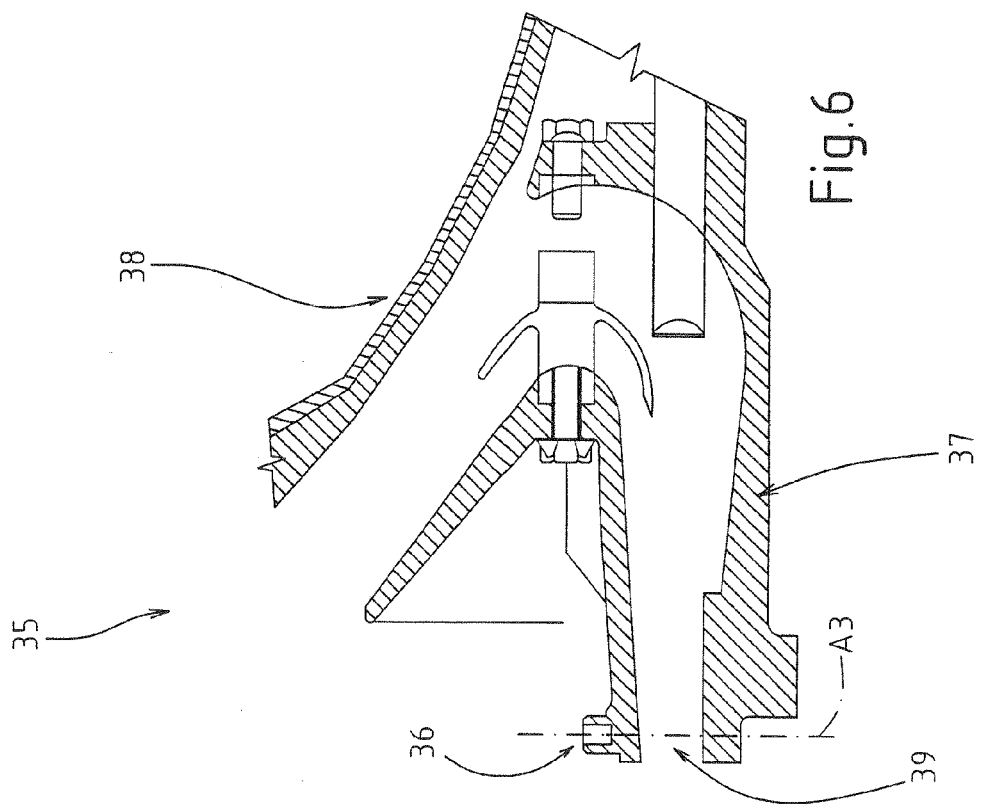
FIG. 6 is a section view, with parts removed for clarity, of a spare part of the gas turbine unit in FIG. 1.

With reference to FIG. 6, the maintenance method of a gas turbine unit 1 according to the present invention substantially contemplates replacing second stator element 8 (FIG. 1) with a third spare stator element 35, in the case in point a spare diffuser-combustion chamber assembly 35.

With reference to FIG. 6, spare assembly 35 is provided with third connecting holes 36 (only one of which is shown in FIG. 6) substantially arranged as in assembly 8. Each third connecting hole 36 extends along an axis A3 and generally presents a circular section. Specifically, spare assembly 35, like assembly 8, comprises a diffuser 37 and an internal portion 38 of the combustion chamber. Spare assembly 35 is provided with a third connecting hole 36*a*, which is substantially arranged at an inlet section 39 of diffuser 37 of spare assembly 35 adapted to be arranged in contact with portion 13 of blade holder casing 6 comprising connecting hole 10*a*.

The step of replacing assembly 8 with spare assembly 35 substantially contemplates:
  verifying whether each pair of first 10 and third connecting holes 36 is aligned;
  for each pair of aligned first 10 and third connecting holes 36, selectively inserting a non-eccentric pin 22*b*, or preferably, an eccentric coupling pin 22*a* in either a third 36 or a first connecting hole 10 and inserting an eccentric bush 24 either in first connecting hole 10 or in third connecting hole 36;
  for each pair of offset first 10 and third connecting holes 36, selectively inserting an eccentric coupling pin 22*a* in either a third 36 or a first connecting hole 10 and inserting an eccentric bush 24 either in first connecting hole 10 or in third connecting hole 36 (according to where the corresponding eccentric pin 22*a* was inserted); specifically, it must be preventively checked whether an eccentric bush is already inserted 24 in first connecting hole 10 of blade holder casing 6 (possibly used during a previous replacement of the diffuser). In the example in FIG. 6, bush 24 is inserted in connecting hole 10*a* of blade holder casing 6.

The insertion of eccentric bush 24 in corresponding either first connecting hole 10 or third connecting hole 24 substantially contemplates adjusting the relative position between eccentric bush 24 and eccentric pin 22*a* according to the relative position between first connecting hole 10 and third connecting hole 36.

The adjustment of the relative position between eccentric bush 24 and eccentric pin 22*a* substantially contemplates evaluating offset D''' existing between third connecting hole 36 and first connecting hole 10, considered as the distance between axes A1 and A3 of first connecting hole 10 and of third connecting hole 36 respectively, and adjusting the relative position between eccentric bush 24 and eccentric pin 22*a* for compensating such offset D'''.

In the non-limitative example in FIG. 6, offset D''' between axes A1 and A3 of first connecting hole 10 and third connecting hole 36*a* respectively is approximately 4 mm. Eccentric bush 24 is arranged in first connecting hole 10*a* so as to determine a displacement of axis A1 of first connecting hole 10a of approximately 2 mm and eccentric pin 22a is arranged in third connecting hole 36a and in bush 24 so as to compensate the remaining offset between connecting holes 36a and 10a by approximately 2 mm.

During the step of inserting, for each pair of third holes 36 and first facing connecting holes 10, eccentric pin 22a in eccentric bush 24 and in corresponding either third connecting hole 36 or first connecting hole 10 does not contemplate the performance of on-site mechanical machining of stator elements 6 and 35.

The maintenance method of a gas turbine unit 1 according to the present invention is applicable to the maintenance of a plurality of gas turbine units 1. Each gas turbine unit 1 of the plurality of gas turbine units is installed in a corresponding electric power plant (not shown in the accompanying figures). The maintenance method of a plurality of gas turbine units 1 contemplates replacing second stator element 8 with third spare stator element 35 as previously described, and repairing second stator element 8 so as to make it available as third spare stator element 35 for any gas turbine unit 1 of the plurality of gas turbine units 1.

The present invention presents the following advantages.

Firstly, the maintenance method of a gas turbine unit according to the present invention allows a rapid replacement of a stator element avoiding the reworking of the connecting holes of the stator elements which much be coupled. The method according to the present invention, indeed, allows to align axes A1 and A3 of the first and third connecting hole respectively simply using an eccentric pin and an eccentric bush without performing any machining on the gas turbine unit. This implies a huge saving in terms of times and costs.

Furthermore, in virtue of the replacement ease and speed of a stator element of a gas turbine unit obtainable with the maintenance method according to the present invention, the use in rotation of a single spare stator element for a plurality of gas turbine units may be contemplated. According to the maintenance method of a plurality of gas turbine units, indeed, the replaced stator element is repaired and used as spare stator element for the subsequent replacements. Advantageously, therefore, the manager of a plurality of plants located in an area, each of which is provided with a gas turbine unit, may stock a single spare stator element for each type. For example, a single spare diffuser, a single spare combustion chamber, etc. In virtue of the maintenance method of a gas turbine unit according to the present invention, indeed, the same spare stator element may be mounted in a plurality of gas turbine units because the coupling by means of eccentric pins and bushes makes each stator element compatible with all the gas turbine units of the plurality of gas turbine units.

The invention claimed is:

1. A maintenance method of a gas turbine unit,
the gas turbine unit comprising:
a first stator element provided with first connecting holes;
at least one second stator element provided with second connecting holes;
coupling pins insertable in the first and second connecting holes for connecting the first stator element to the second stator element; and
the method comprising:
replacing the second stator element with a third spare stator element provided with third connecting holes,
coupling the first stator element to the third spare stator element by eccentric pins and eccentric bushes, the eccentric pins and eccentric bushes being insertable within the first and the third connecting holes,
the eccentric pins having a first cylindrical body and a second cylindrical body, and
the first cylindrical body having a diameter that is smaller than a diameter of the second cylindrical body, and
positioning the first cylindrical body entirely within the first connecting hole.

2. The method according to claim 1, further comprising coupling the first stator element to the third spare stator element by selectively inserting an eccentric bush either in a first connecting hole or in a third connecting hole and inserting an eccentric coupling pin in either the third or the first connecting hole and in the eccentric bush.

3. The method according to claim 1, wherein the first cylindrical body extends along a first axis and the second cylindrical body extends along a second axis, the first axis and the second axis being parallel and non-coinciding.

4. The method according to claim 1, wherein the eccentric bush comprises a hollow circular section cylindrical body, which extends along a third axis and defines a circular section cylindrical seat extending along a fourth axis, and the third axis and the fourth axis being parallel and non-coinciding.

5. The method according to claim 1, wherein coupling the second stator element to a third spare stator element comprises adjusting the relative position of the eccentric coupling pin with respect to the eccentric bush according to the relative position of the first connecting hole with respect to the third connecting hole.

6. The method according to claim 5, wherein the first connecting hole extends along a fifth axis and the third connecting hole extends along a sixth axis,
and adjusting the relative position of the eccentric coupling pin with respect to the eccentric bush by evaluating the distance between the fifth axis and the sixth axis and adjusting the relative position between the eccentric bush and the eccentric pin according to said distance.

7. The method according to claim 1, wherein the first stator element is a blade holder casing of a compressor and the second stator element is a diffuser-combustion chamber assembly.

8. A maintenance method of a gas turbine unit,
the gas turbine unit comprising:
a first stator element provided with first connecting holes;
at least one second stator element provided with second connecting holes;
coupling pins insertable in the first and second connecting holes for connecting the first stator element to the second stator element; and
the method comprising:
replacing the second stator element with a third spare stator element provided with third connecting holes, and
coupling the first stator element to the third spare stator element by eccentric pins and eccentric bushes, the eccentric pins and eccentric bushes being insertable within the first and the third connecting holes, wherein the eccentric pins are headless and defined by a first cylindrical body and a second cylindrical body the first cylindrical body having a diameter that is smaller than a diameter of the second cylindrical body.

9. The method according to claim 8, further comprising coupling the first stator element to the third spare stator element by selectively inserting an eccentric bush either in a first connecting hole or in a third connecting hole and inserting an eccentric coupling pin in either the third or the first connecting hole and in the eccentric bush.

10. The method according to claim 8, wherein the eccentric coupling pin comprises a first cylindrical body extending along a first axis and a second cylindrical body extending along a second axis, the first axis and the second axis being parallel and non-coinciding.

11. The method according to claim 8, wherein the eccentric bush comprises a hollow circular section cylindrical body, which extends along a third axis and defines a circular section cylindrical seat extending along a fourth axis, and the third axis and the fourth axis being parallel and non-coinciding.

12. The method according to claim 8, wherein coupling the second stator element to a third spare stator element comprises adjusting the relative position of the eccentric coupling pin with respect to the eccentric bush according to the relative position of the first connecting hole with respect to the third connecting hole.

13. The method according to claim 12, wherein the first connecting hole extends along a fifth axis and the third connecting hole extends along a sixth axis, and adjusting the relative position of the eccentric coupling pin with respect to the eccentric bush by evaluating the distance between the fifth axis and the sixth axis and adjusting the relative position between the eccentric bush and the eccentric pin according to said distance.

14. The method according to claim 8, wherein the first stator element is a blade holder casing of a compressor and the second stator element is a diffuser-combustion chamber assembly.

15. The method according to claim 1, further comprising positioning the eccentric bushing entirely within the connecting hole.

* * * * *